Feb. 14, 1956  R. C. STEELE  2,734,843
METHOD OF PRODUCING HONEYCOMB
Filed Dec. 2, 1952  4 Sheets-Sheet 1
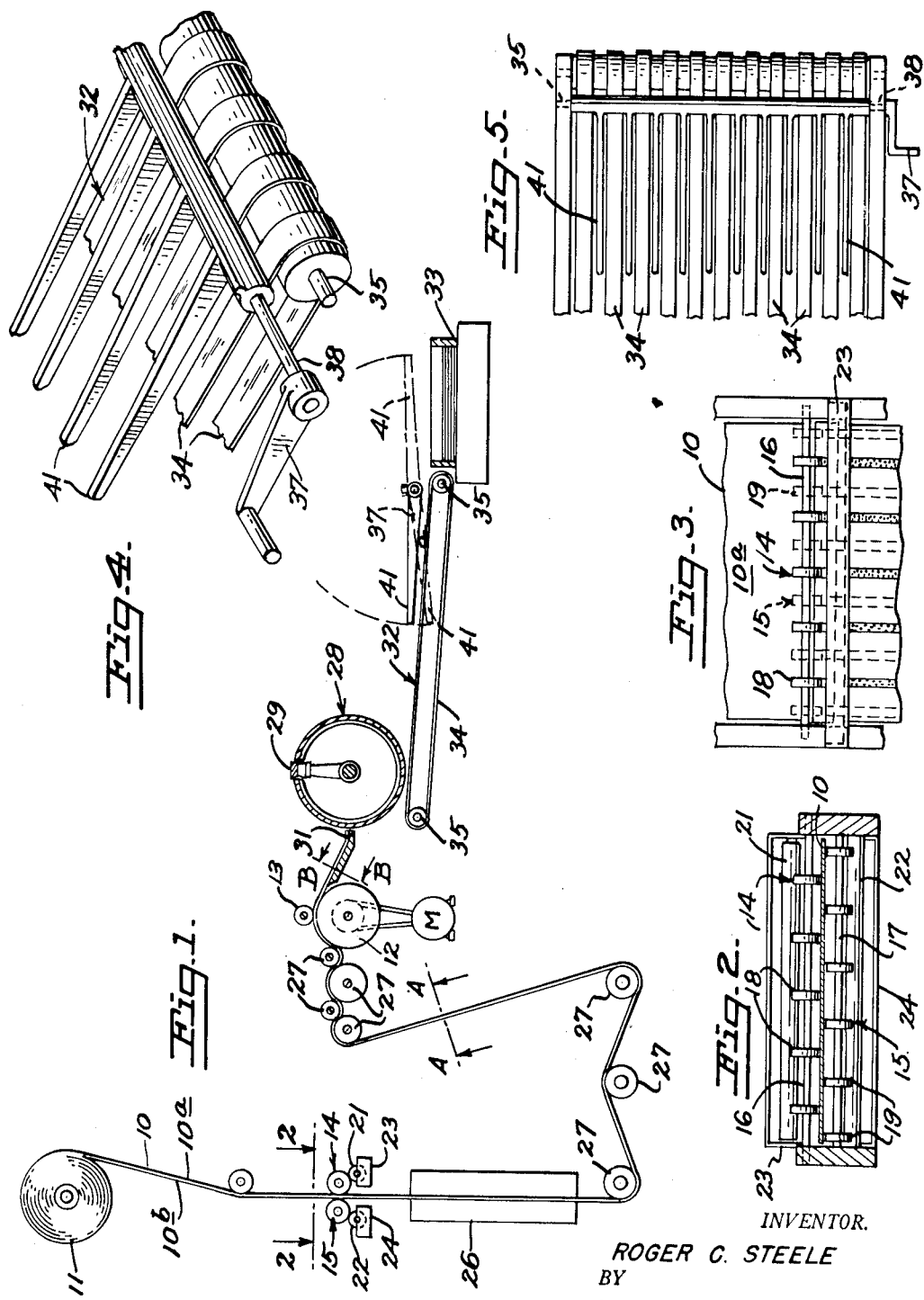
INVENTOR.
ROGER C. STEELE
BY
Townsend and Townsend
ATTORNEYS

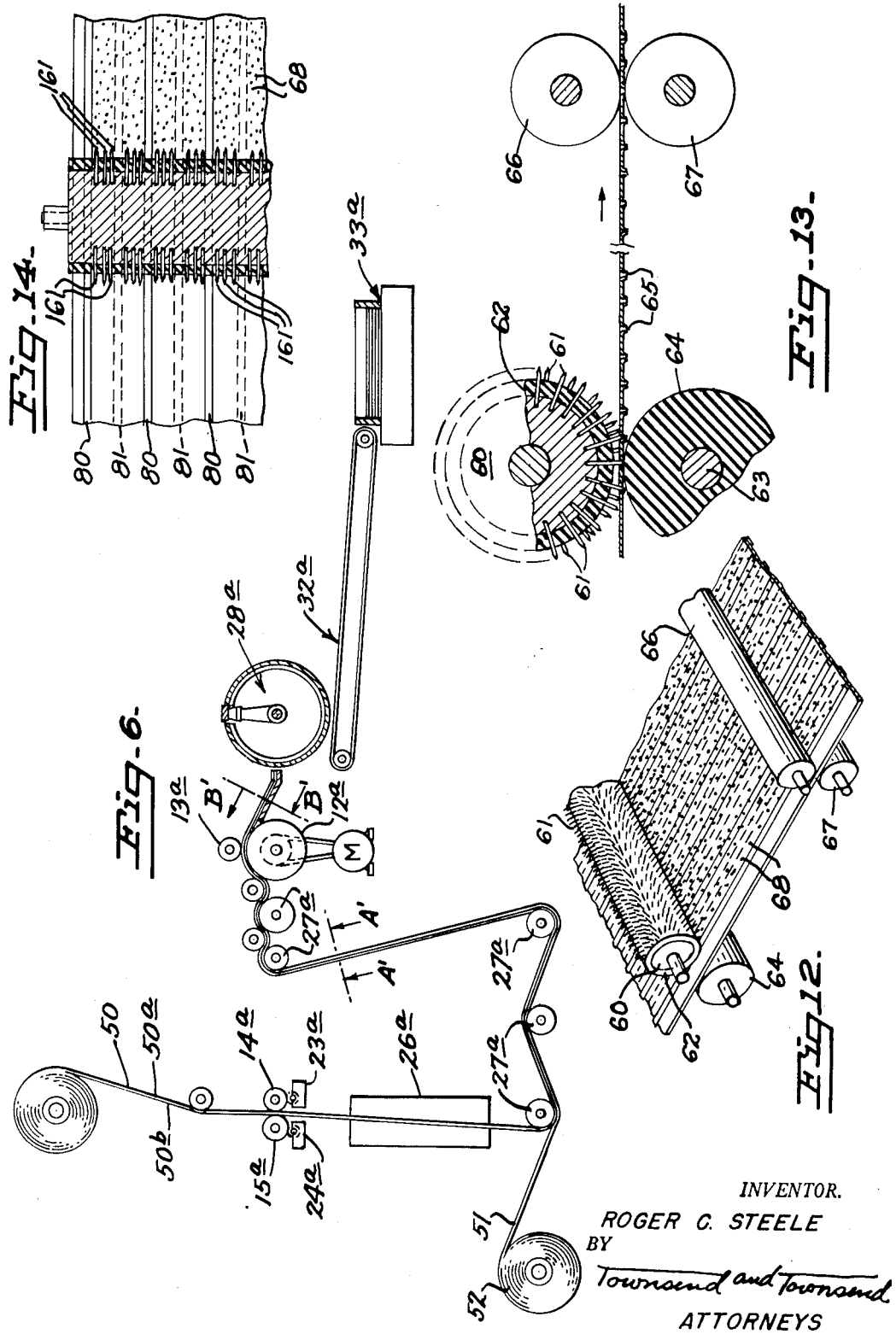

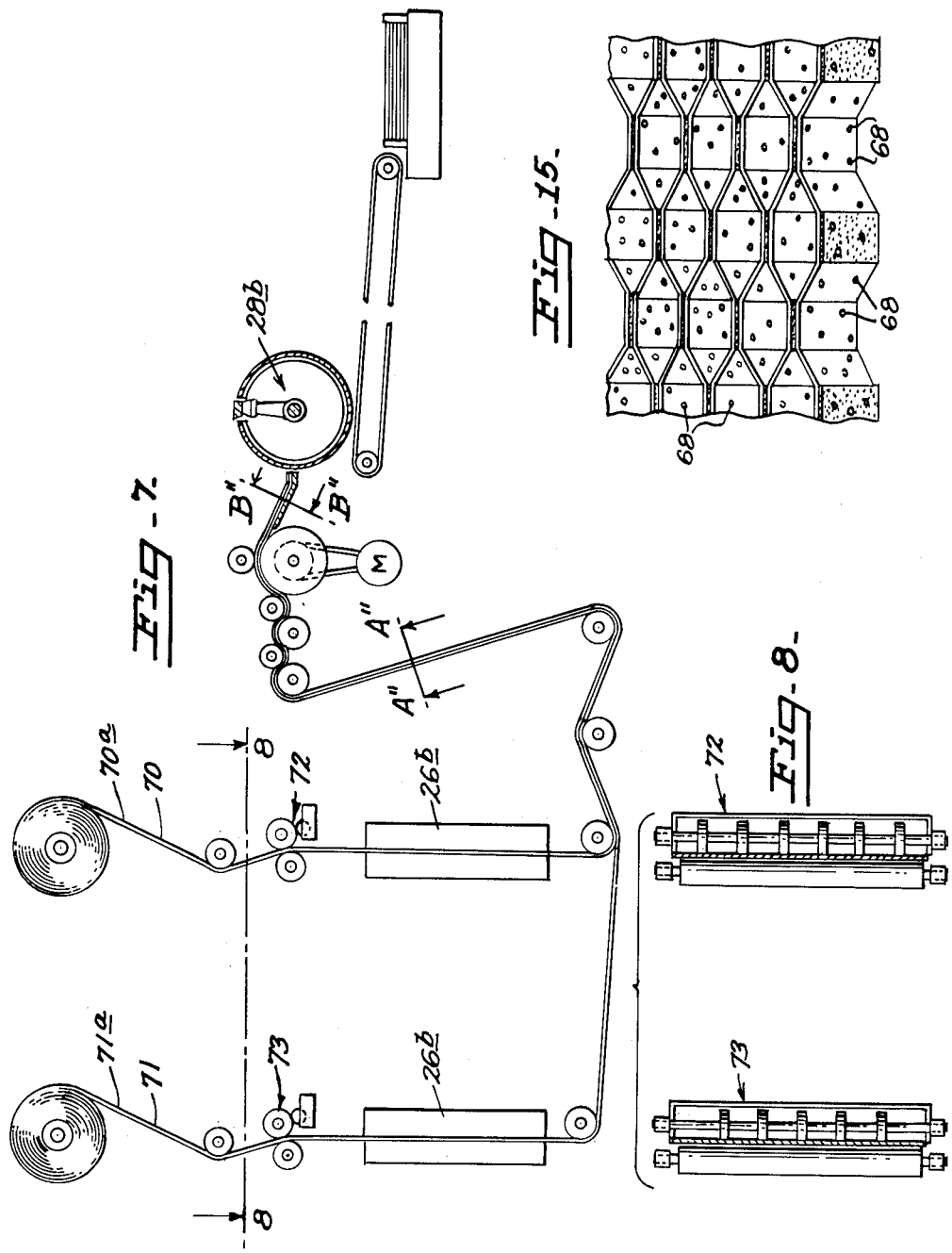

Feb. 14, 1956 R. C. STEELE 2,734,843
METHOD OF PRODUCING HONEYCOMB
Filed Dec. 2, 1952 4 Sheets-Sheet 4

INVENTOR.
ROGER C. STEELE
BY
Townsend and Townsend
ATTORNEYS

United States Patent Office 2,734,843
Patented Feb. 14, 1956

---

2,734,843

METHOD OF PRODUCING HONEYCOMB

Roger C. Steele, Berkeley, Calif., assignor to Hexcel Products Inc., a corporation of California Application December 2, 1952, Serial No. 323,634

15 Claims. (Cl. 154—122)

This invention relates to the art of making honeycomb, and more particularly to a new and improved method of producing unexpanded blocks of expandable honeycomb.

A principal object of the invention is to disclose a method of producing unexpanded blocks of honeycomb by a substantially continuous process which includes the steps of applying lines of an adhesive to one or more continuous webs of material, cutting the webs into individual sheets of equal length, and then stacking and adhering said sheets together in pre-selected relationship to form an unexpanded block of expandable honeycomb.

A more specific object of the present invention is to disclose a method comprising the steps referred to in the foregoing paragraph and which includes the use of a dry-line type adhesive. Certain valuable advantages of employing a dry-line adhesive over a wet-line type of adhesive will be more fully explained hereinafter.

Another object of the invention is to provide a method of producing perforate metal foil honeycomb by the expansion process.

Other objects and advantages of the present invention will become apparent upon reading the following specification and referring to the accompanying drawings in which similar characters of reference represent corresponding parts in each of the several views.

In the drawings:

Fig. 1 is a diagrammatic view of a type of machine suitable for practising the method.

Fig. 2 is an enlarged sectional view taken on line 2—2 of Fig. 1.

Fig. 3 is an enlarged front elevational view of the glue applicating means in association with a web of material.

Fig. 4 is an enlarged fragmentary perspective view of the sheet conveying mechanism.

Fig. 5 is a plan view of the same.

Fig. 6 is a diagrammatic view of a first modified type of machine.

Fig. 7 is a diagrammatic view of a second modified type of machine.

Fig. 8 is a sectional view taken on line 8—8 of Fig. 7.

Fig. 12 is a perspective view of one type of perforating means which may be optionally included in a machine embodying the invention to produce perforate metal foil honeycomb.

Fig. 13 is an enlarged fragmentary view in side elevation of the arrangement shown in Fig. 12.

Fig. 14 is a fragmentary top plan view partially in section of a modified type of perforating means.

Fig. 15 is an enlarged fragmentary perspective view of a perforate metal foil honeycomb product constructed according to the present invention.

Figure 9:
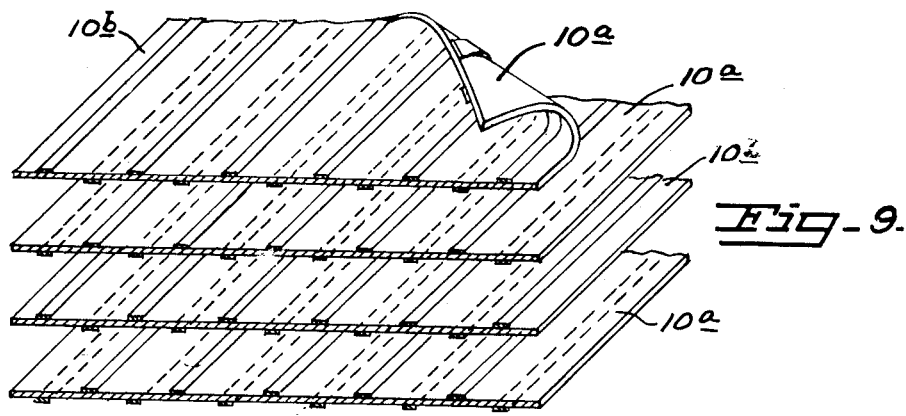
Fig. 9 is a perspective view of a stack of sheets shown in exploded relationship as produced according to the method described with specific reference to Fig. 1.

The present invention will be explained hereinafter by making separate specific reference to the three modified types of machines shown in Figs. 1, 6 and 7, respectively. The construction of the machines themselves does not, per se, constitute a part of the present invention and is therefore shown diagrammatically for the purpose of more conveniently explaining several illustrative modified practices of the invention. The machines illustrated in Figs. 1, 6 and 7, respectively, are particularly adapted for practising the methods herein disclosed employing a dry-line adhesive, and therefore practice of the present invention will be described with particular reference to employment of dry-line type adhesives. Explanation will also be made hereinafter concerning certain aspects involved in the practice of the invention employing wet-line type adhesives. There will further be included a discussion and explanation of certain optional practices relating specifically to production of perforate metal foil honeycomb.

One preferred method of making an unexpanded block of expandable honeycomb according to the invention may be most readily understood by having reference to Figs. 1–5 in the drawings.

More specifically, Fig. 1 shows a continuous web 10 of the material out of which the honeycomb is to be made, such as metal foil, paper, resin impregnated fabric, or the like, being continuously fed from roll 11 and forwarded through the machine by driving rollers 12 and 13. Continuously moving web 10 is shown as passing through a pair of glue or adhesive applicators 14 and 15. These applicators may comprise oppositely disposed shafts 16 and 17, on each of which is mounted a plurality of spaced applicating washers or discs 18 and 19. Upon rotation of shafts 16 and 17 applicating washers 18 and 19 are adapted to continuously pick up quantities of liquid adhesive from pick-up rollers 21 and 22, with which said washers are in continuous frictional contact, and which said pick-up rollers rotate in partially submerged position within adhesive tanks 23 and 24. The applicating washers 18 and 19 are alternately staggered with respect to one another and function to apply spaced parallel lines of web adhesive to opposite sides of the web and in such manner that the glue lines applied to the obverse side 10a of web 10 by applicators 14 are spaced between the glue lines applied to the reverse side 10b of web 10 by applicators 15.

As mentioned above, it is a specific object of the invention to disclose a method of producing honeycomb employing what is referred to in the trade as a "dry-line" adhesive. The term "dry-line" adhesive as used herein is meant to refer to and designate those types of adhesives which can be advanced through drying or polymerization, or a combination of both, from a liquid first stage to a relatively dry, non-tacky second stage, then to a temporary flowable or tacky third stage, and thence to a relatively dry, infusible fourth stage. One specific type of dry-line adhesive which has been found to be particularly satisfactory in producing honeycomb according to the present invention is a vinylphenolic synthetic resin. Such resin may be continuously applied to the web 10 in liquid form by the applicating means hereinabove described, and then rapidly advanced, as by drying or polymerization, to a substantially dry, non-tacky condition by subjecting it to heat. In this connection a suitable oven, such as indicated at 26, may be provided through which the web 10 passes after the wet adhesive resin has been applied thereto. The oven may be of any suitable and conventional construction, and in this regard I have found that an electrically heated hot-air type oven, maintained at a temperature of about 250°–300° F., will substantailly dry out an adhesive such as vinyl-phenolic to its second stage within a matter of twenty to thirty seconds.

From the oven 26 the web 10 may be forwarded through a series of conventional guide and idler rollers, such as indicated at 27, for example, through drive rollers 12 and 13, previously mentioned, into a cutting station such as a rotary cutter 28. Rotary cutter 28 is shown as being provided with a rotating cutting blade 29 and stationary blade 31, and it will be readily understood that simply by regulating the rotary speed of the cutter in appropriate relation to the speed of the web 10 being forwarded into contact with said cutter, the web may be automatically cut into individual sections or sheets of uniform size. In this connection I have found that a conventional type roll sheet cutter may be employed satisfactorily to cut the web of honeycomb material into sections of desired length. One such commercially available sheeter which has been found satisfactory in this regard is manufactured by the Charles Beck Machine Corp. of Philadelphia, Pennsylvania, under the trade description "Automatic Roll Sheet Cutter," although it is understood that the practice of the invention is not limited to any particular kind, type, make, or model of cutting means.

After cutting, the sections of web material are conveyed to a stacking zone whereat said sections are stacked together in preselected relationship to form an unbonded block of unexpanded honeycomb. Thus, for example, the above-described type of commercial sheeter is normally equipped with a belt conveyor, indicated generally at 32, and a conventional joggle box or table, indicated generally at 33. Sheet conveyor 32 is located adjacent and below the rotary cutter and may be continuously operated to convey cut sections of the web 10 to the stacking zone comprising said joggle table 33. Such a conveyor may comprise a plurality of spaced endless belts 34 mounted on rotatable drive and guide shafts 35.

The sections of material cut from the web 10 by rotary cutter 28 are stacked one upon the other with the obverse side adhesive lines of each section in contact with the obverse side adhesive lines of an adjacent section and with the reverse side adhesive lines of each section in contact with the reverse side adhesive lines of an adjacent section, as shown in Fig. 9. In the specific arrangement shown in Fig. 1, it is observed that the sections of material cut from the web are all conveyed in flat position on endless belts 34 of conveyor 32 with the reverse sides 10b of the material facing upwardly and with the obverse sides thereof facing downwardly. In order to stack the sections in the order and manner heretofore mentioned, a suitable sheet turning mechanism, such as indicated generally at 37, may be provided to turn over or flip every other sheet which is conveyed to the joggle table and stacked. The specific embodiment of the sheet turner mechanism shown in the drawings comprises a rotatably supported shaft 38, having a crank handle or other suitable means for manually or mechanically rotating the same which extends transversely of endless belts 34. Rigidly keyed or otherwise affixed to shaft 38 are a plurality of elongated turning arms or fingers 41 extending parallel to belts 34 and arranged in spaced, staggered relationship with respect to said belts. The arrangement is preferably such that when the turner mechanism is in its normal or rest position, as shown in full lines in Fig. 1, all portions of the arms and shaft thereof are disposed above the plane of the upper conveyor belts so that a sheet or section of material being conveyed from the cutter 28 to joggle table 33 will pass beneath the sheet turner onto the joggle table without obstruction. As above noted, the turner may be operated manually or by suitable mechanical means synchronized with the rotary speed of the cutter so as to swing downwardly between the belts and thence upwardly through approximately a 180° arc in order to pick up and flip over every other section or sheet of material which is conveyed to the stack of material being continuously built up on the joggle table 33. It is apparent that the turning or flipping over of every other sheet according to the method may also be done by hand without the aid of any turning mechanism.

From the foregoing it is seen that the use of a dry-line adhesive permits the web 10, after it leaves the drying oven 26, to pass through the drive rollers 12—13 by guide rollers 27, cutter 28, and along conveyor 32 into joggle box 33, without danger of the adhesive lines running or smearing or adhering to any elements of the machine through which the glued material passes.

After the desired number of sheets or sections of material have been stacked, said stack may be removed from the joggle box and subjected to heat and pressure sufficient to cause the lines of adhesive to advance to their third or flowable state. As a specific example, if a dry-line adhesive employed comprises a vinyl-phenolic resin, the stack of glued material may be placed in a suitable press under pressure, preferably 10 to 20 p. s. i., and subjected to an oven temperature of about 330° F. for a sufficiently long period of time to initially advance the resin to its flowable or tacky condition and thereafter to its final dry, infusible state. It is understood, of course, that the amount of pressure, the heat temperatures, and the duration of time which said stack is subject to heat and pressure in large measure depend on the specific choice of dry-line adhesive which has been selected. These pressure, temperature, and time factors are well within the skill of the art and do not, therefore, constitute a part of the present invention.

The type of machine illustrated diagrammatically in Fig. 6 may be considered for the most part as substantially identical in structure and operation to the type of machine shown in Figs. 1–5, inclusive, and hereinabove discussed. Accordingly, elements of the machine shown in Fig. 6 are numbered similarly to equivalent or corresponding elements comprising the machine shown in Figs. 1–5, inclusive, but are suffixed by the letter "a" to distinguish them in the drawings.

The modified machine shown in Fig. 6 illustrates how unexpanded blocks of honeycomb may be produced in a substantially continuous operation from two or more continuous webs of material. More specifically, a continuous web of material 50 having obverse and reverse sides 50a and 50b may be fed through glue applicators 14a and 15a, which said applicators are adapted to apply alternately staggered lines of perfectly dry line adhesive to the obverse and reverse sides of the web as above explained with regard to the operation of glue applicators 14 and 15. If a dry line adhesive is employed it may be rapidly dried to its incipient dry second state in oven 26a prior to being moved into contact with the guide rollers 27a and with second blank web 51, which latter web is adapted to be continuously fed from feed roller 52 through the machine at the same speed as web 50. Web 51 to which no glue lines are applied is continuously forwarded along with web 50 into contact with rotary cutter 28a whereat both webs 50 and 51 may be simultaneously cut into sections of equal length as by rotary cutter 28a. The cut sections are conveyed to a stacking zone such as joggle table 33a via conveyor 32a, whereat the sections cut from web 51 are automatically stacked in preselected relationship with sections cut from web 50. In this modified practice of the invention, it is unnecessary to turn or flip over, as by previously referred to turning mechanism 37, alternate cut sheets of material.

Figure 10:
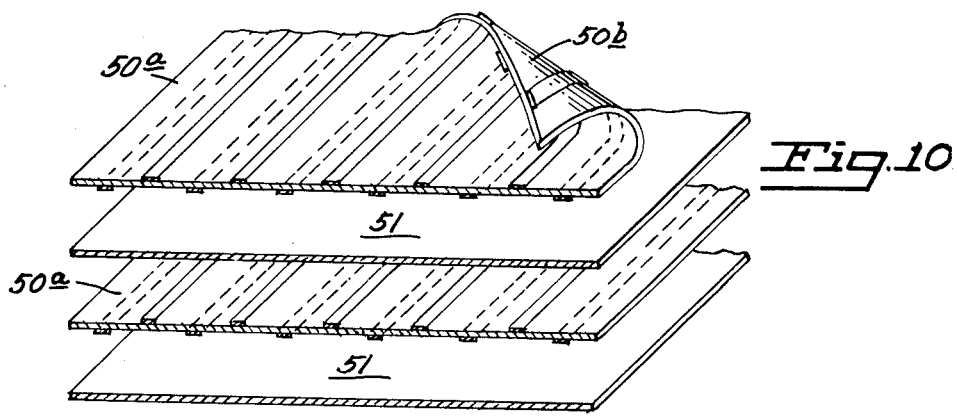
Fig. 10 is a perspective view of a stack of sheets shown in exploded relationship as produced according to the method described with specific reference to Fig. 6.

Fig. 10 discloses the arrangement of cut sections in the stack wherein it is seen that between each two glued sections cut from web 50 there is interposed a section cut from web 51 to which no glue lines have been applied.

When such a stack of material has been subjected to appropriate heat and temperature, again assuming a dry line adhesive is employed, the bonding lines formed on both the obverse and reverse sides of sections cut from web 50 will be caused to flow into adhering contact with contiguous areas of sections cut from web 51.

A further modified practice of the invention may be readily understood by having specific reference to Figs. 7 and 8, which disclose two webs of material 70 and 71 being forwarded through associated glue applicators 72 and 73, adapted to apply adhesive lines to the obverse sides of said webs, with the glue lines applied by applicator 72 to the obverse side 70a of web 70, in staggered relationship to the glue lines applied by applicator 73 to the obverse side 71a of web 71.

Figure 11:
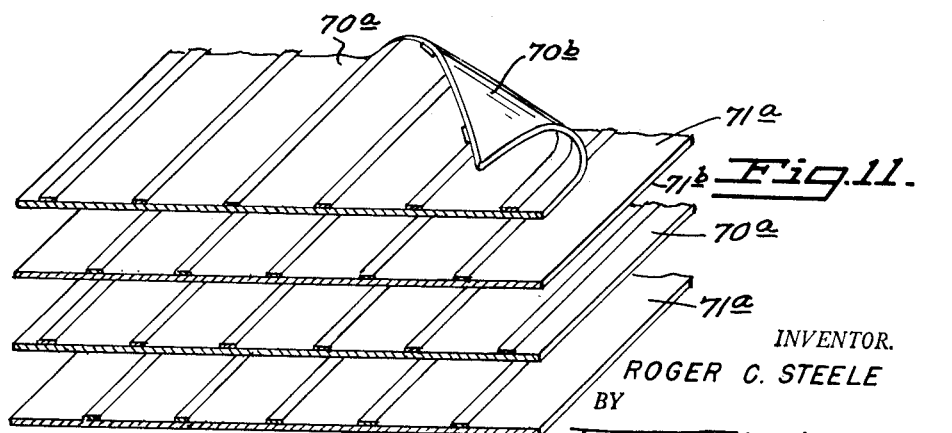
Fig. 11 is a perspective view of a stack of sheets shown in exploded relationship as produced according to the method described with specific reference to Fig. 7.

Appropriate drying ovens 26b may be provided and sections of uniform size are simultaneously cut from each of the webs, as by cutter 28b and conveyed to the stacking table. A stack of the material produced in accordance with this modified practice of the invention is shown in Fig. 11. By application of appropriate heat and pressure to the stack, dry line adhesive lines applied to the obverse side 70a of sheets cut from web 70 will be caused to adhere to the reverse sides 71b of contiguous sheets cut from web 71; and, similarly, the adhesive lines applied to the obverse side 71a of sections cut from web 71 will be caused to adhere to the reverse sides 70b of contiguous sheets cut from web 71. Thereupon the glue lines may be advanced to their final relatively infusible state, in the manner aforesaid, thereby forming an unexpanded block of honeycomb.

The foregoing described practices according to the invention have been explained with particular reference to use of dry-line type adhesives. A valuable advantage in employing such material is that it may be oven dried almost immediately after its application to the web material and thereafter there exists no practical possibility of the glue lines running or smearing during subsequent cutting, stacking, or like operations.

However, practice of the present invention, in its broader aspects, is not limited to the use of only dry-line adhesives. More specifically, the method of applying alternately staggered lines to one or more continuously moving webs of material and then cutting and stacking sections of said material in preselected relationship to form a stack of unexpanded honeycomb may also be accomplished using more conventional wet-line types of adhesive. The term "wet-line adhesive" as used herein is meant to refer to and designate those types of adhesives which are not or cannot be advanced through an intermediate dry stage and thence to a flowable tacky stage as in the case of dry-line type adhesives, but remain in wet or tacky condition until dried or cured to their final state.

It will suffice to remark that in the practice of the methods disclosed herein employing wet-line adhesives, it is evident that reasonable precautionary measures must be taken to prevent running or smearing of the wet glue lines during all operations subsequent to application of the glue lines to the web or webs, and prior to and during cutting and stacking of the uniformly sized sheets. Such precautionary measures are considered to be within the skill of the art and further elaboration thereon is considered unnecessary.

In the manufacture of metal foil honeycomb in particular, it is sometimes desirable to perforate the metal foil in such manner that air communication between all expanded cells thereof is provided. One of the stated objects of the present invention is to provide a novel method of producing perforate metal foil in a continuous process. In this connection perforating means may be readily incorporated in any of the types of machines hereinabove mentioned. More specifically, Fig. 12 discloses a preferred type of perforator which may comprise a cylinder 60, provided about its periphery with a plurality of closely spaced, radially projecting, puncturing needles, such as indicated at 61, which may be imbedded within a layer of vulcanized rubber 62. Preferably, a backing cylinder comprising a shaft 63 and having a thick covering of resilient, self-sealing material, such as rubber 64, is mounted adjacent the perforating cylinder. As illustrated in Figs. 12 and 13, when one or more webs of material (such as heretofore indicated at 10, 50—51, or 70—71, for example) are passed between cylinders 60 and 63, the puncturing needles 61 provided on cylinder 60 will puncture a plurality of relatively tiny apertures through the web. Preferably, the puncturing needles are closely spaced together so that a great number of the relatively tiny apertures will be formed through the web substantially throughout the entire length and width thereof, particularly between the glue lines applied to the web.

In view of the fact that the needles in puncturing through the metal foil web will have a tendency to produce small projecting burrs, such as indicated at 65, on the side of the web opposite that from which the puncturing occurs, it is desirable to provide flattening rollers, such as 66 and 67, which are designed to substantially flatten out the burrs as the web is passed between said rollers.

The perforating unit comprising elements 60—67 may be incorporated with any of the types of machines hereinabove described at substantially any point located between the drying oven and the cutting zone. For example, the perforating mechanism may be installed to operate anywhere within the zone delineated by reference lines AA—BB, appearing on Fig. 1, and/or reference lines A'A'—B'B', appearing in Fig. 6, and/or reference lines A"A"—B"B" appearing in Fig. 7.

By making the perforations relatively tiny in size, as, for example, .001–.01 inch in diameter, and by perforating the metal foil webs after the liquid dry-line adhesive lines have been oven dried to their non-tacky, non-flowable, second state, no practical possibility exists for the adhesive to flow or seep through the punctured apertures to the opposite side of the web or webs to which the adhesive lines have been applied. This insures against the possibility of stray adhesive bonding adjacent sheets to one another except at preselected points—namely, along the staggered bonding lines applied by the glue applicators.

Moreover, the perforations are preferably spaced sufficiently close together, in scattered pattern, so as to give practical assurance that in the final product produced at least one aperture or opening is formed between each cell and its adjacent cell or cells whereby air communication is established between all of the cells in a given expanded slice or block of the honeycomb material.

More specifically, in order to eliminate the need of having to form the perforations through the web material in any predetermined mathematical or orderly relationship with respect to the particular spacing, location or width of glue lines, and/or thickness of a given honeycomb block to be produced, and in order to accomplish certain other important objects and advantages hereinafter discussed, I prefer to perforate the metal foil web material with a relatively large number of closely spaced apertures 68 arranged in scattered pattern throughout substantially the entire length and width of the web material and particularly between the adhesive lines. One preferred practice is to perforate the web or webs of metal foil in a random or scattered pattern, such as shown in Figs. 12, 14 and 15, with adjacent perforations spaced a maximum distance of about $3/16$ to $7/32$ inch apart from one another and in such manner that approximately 25 to 35 perforations are provided per square inch of web material. It has been found that webs perforated in this manner will, as a matter of probability rather than mathematical certainty, establish substantially complete air communication between all cells of a given block of honeycomb having a nominal expanded cell size of $1/8$ inch or larger, and which has a thickness (as measured in the direction of its cell openings) of 3/16 inch or greater.

A further important object and advantage in perforating the web material in a scattered, rather than orderly, pattern is to minimize the possibility of producing perforate honeycomb having all, or a substantial number, of its perforations or communicating apertures disposed in a common plane or in coaxial or parallel alignment. It has been determined that forming perforate metal foil honeycomb with a substantial number of its communicating apertures in orderly fashion with said apertures disposed parallel, coaxially, and/or coplanar with respect to one another will tend to lessen the compressive and/or shear strength of the material to a greater extent than by forming the perforations in a random or scattered pattern whereby a relatively insubstantial number of communicating apertures are arranged in parallelism, coaxially or coplanar, with one another. Thus, for example, where a great number, or substantially all, of the communicating apertures are disposed in a common plane parallel to the face surface of the honeycomb sheet, such an arrangement will tend to lessen the compressive strength of the sheet, and generally speaking, where said apertures are disposed parallel, coaxially and/or co-planar relative to one another, such an arrangement will tend to lessen the shear strength of the honeycomb sheet.

The cylindrical perforator shown in Fig. 12 is adapted to perforate and puncture the web material throughout its entire area including the adhesive lines applied thereto. In view of the fact that only those perforations formed and located between the adhesive lines ultimately function to establish communicating apertures between the cells, it is evident that other types of perforating means can, if desired, be employed to form perforations only between said adhesive lines. In this connection, Fig. 14 illustrates a modified perforator which is provided with a plurality of spaced annular groups 161 of puncturing needles—the spacing between the individual groups corresponding to the spacing or distance between the staggered adhesive lines 80 and 81 applied to the obverse and reverse sides of the web material. In short, the needle groups are arranged and spaced relative to the adhesive lines of the web so as to perforate only those unbonded areas between said adhesive lines.

The practical advantage in employing a perforator of the type shown in Fig. 12 over that shown in Fig. 14 is that the former may be employed to perforate web material without regard to the spacing between, or width of, the adhesive lines applied thereto—thus providing greater flexibility in the manufacture of honeycomb of varying nominal cell size.

Although the present invention has been described in considerable detail for purposes of clarity of understanding, it is understood that certain changes and modifications may be made within the spirit of the invention as limited only by the scope of the claims appended hereto.

I claim:

1. In the manufacture of honeycomb material the method which includes the steps of; applying longitudinally extending, spaced, parallel lines of adhesive to face surfaces of continuously moving web material, cutting the web material into completely separated flat sheets of uniform size, and thereafter adhering said sheets to one another with the obverse side of each sheet adhered to an adjacent sheet by a plurality of spaced parallel lines of adhesive and with its reverse side adhered to an adjacent sheet by lines of adhesive disposed in staggered parallel relationship to the said lines of adhesive to which its obverse side is adhered, thereby forming a block of unexpanded honeycomb.

2. The method of claim 1 including the use of continuously moving metal foil web material and including the step of forming a plurality of relatively closely spaced perforations arranged in scattered pattern through said metal foil web and between said adhesive lines prior to cutting said web material and adhering said flat sheets to one another.

3. In the manufacture of honeycomb material, the method which includes the steps of applying spaced, parallel, longitudinally extending, lines of liquid adhesive of a type capable of being dried to a dry, non-tacky condition and thereafter advanced to a flowable tacky state and thence to a final cured, relatively infusible state to face surfaces of continuously moving web material; drying said adhesive to its substantially dry, non-tacky condition; cutting said web material into completely separated flat sheets of uniform size; then stacking said sheets one upon the other and also advancing said adhesive to its flowable tacky state to cause the obverse side of each sheet to adhere to an adjacent sheet by spaced, parallel lines of adhesive and to cause the reverse side of each sheet to adhere to an adjacent sheet by spaced parallel lines of adhesive disposed in staggered parallel relationship to said obverse side lines of adhesive; and then advancing said adhesive lines to a final cured, relatively infusible state, thereby forming an unexpanded block of expandable honeycomb material.

4. The method according to claim 3 including the additional step of forming a plurality of relatively small, closely spaced apertures throughout the width and length of said web, in scattered pattern and between said adhesive lines subsequent to advancing said adhesive to a substantially dry non-tacky condition and prior to the stacking of the cut sheets in preselected relationship.

5. In the art of making perforate metal foil honeycomb material, the method which includes the steps of: applying spaced bonding lines of adhesive to a flat web of metal foil from which the honeycomb is to be made; perforating said web with a plurality of relatively small, closely spaced apertures in scattered pattern between said bonding lines throughout the length and width of said web; cutting said web into completely separated sheets of uniform size; and then stacking said sheets and adhering adjacent sheets to one another along said bonding lines to form a block of unexpanded honeycomb.

6. A method of making an unexpanded block of honeycomb comprising the steps of: applying to the obverse side of a continuously moving web of material spaced, longitudinally extending, parallel lines of adhesive; applying to the reverse side of said web of material spaced, longitudinally extending, parallel lines of adhesive in staggered relationship to said adhesive lines applied to the obverse side of said web; cutting said web into completely separated flat sections of uniform size; then stacking and adhering said flat sections one upon the other with the obverse side adhesive lines of each section in aligned contact with the obverse side adhesive lines of an adjacent section and with the reverse side adhesive lines of each section in aligned contact with the reverse side adhesive lines of an adjacent section.

7. A method of making an unexpanded block of honeycomb comprising the steps of: applying to the obverse side of a continuously moving web of material spaced, longitudinally extending, parallel lines of a liquid adhesive capable of being dried to a substantially dry, non-tacky condition and thereafter advanced to a flowable tacky state; applying to the reverse side of said web of materail spaced, longitudinally extending, parallel lines of said liquid adhesive in staggered relationship to said adhesive lines applied to the obverse side of said web; drying said liquid adhesive lines on both sides of said web to a substantially dry non-tacky condition; cutting said web into completely separated flat sections of uniform size; then stacking and adhering said flat sections one upon the other with the obverse side adhesive lines of each section in aligned contact with the obverse side adhesive lines of an adjacent section and with the reverse side adhesive lines of each section in aligned contact with the reverse side adhesive lines of an adjacent section, and then advancing said adhesive lines to a flowable, tacky state to cause said aligned contacting adhesive lines of the stacked sections to adhere to one another.

8. A method of making an unexpanded block of honeycomb comprising the steps of: applying to the obverse side of a continuously moving web of metal foil material spaced, longitudinally extending, parallel lines of a liquid adhesive capable of being dried to a substantially dry, non-tacky condition and thereafter advanced to a flowable tacky state; applying to the reverse side of said web of material spaced, longitudinally extending, parallel lines of said liquid adhesive in staggered relationship to said adhesive lines applied to the obverse side of said web; drying said liquid adhesive lines on both sides of said web to a substantially dry-non-tacky condition; then forming a plurality of closely spaced relatively small perforations in scattered pattern through said web between said adhesive lines applied to both sides of said web; cutting said web into completely separated sections of uniform size; then stacking said flat sections one upon the other with the obverse side adhesive lines of each section in aligned contact with the obverse side adhesive lines of an adjacent section and with the reverse side adhesive lines of each section in aligned contact with the reverse side adhesive lines of an adjacent section; and then advancing said adhesive lines to a flowable tacky state to cause said aligned contacting adhesive lines of the stacked sections to adhere to one another.

9. A method of making an unexpanded block of honeycomb comprising the steps of: applying to the obverse side of a continuously moving first web of material equidistantly spaced parallel lengthwise extending lines of adhesive; applying to the obverse side of a second continuously moving web of material of the same width as said first web equidistantly spaced parallel lengthwise extending lines of adhesive in staggered relationship with respect to the adhesive lines applied to the obverse side of said first web; cutting said first and second continuous webs into completely separated flat sections of equal length; then alternately stacking with one another sections cut from said first web with sections cut from said second web, with the obverse side adhesive lines of each section cut from said first web in contact with the reverse side of an adjacent section cut from said second web, and with the obverse side adhesive lines of each section cut from said second web disposed parallel to and between said obverse side adhesive lines of sections cut from said first web and in contact with the reverse side of an adjacent section cut from said first web.

10. A method of making an unexpanded block of honeycomb comprising the steps of: applying to the obverse side of a continuously moving first web of material equidistantly spaced parallel lengthwise extending lines of a liquid adhesive capable of being dried to a substantially dry, non-tacky condition and thereafter advanced to a flowable tacky state, applying to the obverse side of a second continuously moving web of material of the same width as said first web equidistantly spaced parallel lengthwise extending lines of said liquid adhesive in staggered relationship with respect to the adhesive lines applied to the obverse side of said first web; drying said liquid adhesive lines applied to both said first and second webs to a substantially dry non-tacky condition; cutting said first and second continuous webs into completely separated flat sections of equal length; then alternately stacking with one another sections cut from said first web with sections cut from said second web, with the obverse side adhesive lines of each section cut from said first web in contact with the reverse side of an adjacent section cut from said second web, and with the obverse side adhesive lines of each section cut from said second web disposed parallel to and between said obverse side adhesive lines of sections cut from said first web and in contact with the reverse side of an adjacent section cut from said first web; and then advancing said adhesive lines to a flowable tacky state to cause said lines to adhere to the adjacent sections of material with which said adhesive lines are in respective contact.

11. A method of making an unexpanded block of honeycomb comprising the steps of: applying to the obverse side of a continuously moving first web of metal foil material equidistantly spaced parallel lengthwise extending lines of adhesive; applying to the obverse side of a second continuously moving web of material of the same width as said first web equidistantly spaced parallel lengthwise extending lines of adhesive in staggered relationship with respect to the adhesive lines applied to the obverse side of said first web; forming a plurality of closely spaced relatively small perforations in scattered pattern through each said first and second webs between said adhesive lines applied thereto; cutting said first and second continuous webs into completely separated sections of equal length; then alternately stacking with one another sections cut from said first web with sections cut from said second web, and with the obverse side adhesive lines of each section cut from said first web in contact with the reverse side of an adjacent section cut from said second web, and with the obverse side adhesive lines of each section cut from said section web disposed parallel to and between said obverse side adhesive lines of sections cut from said first web and in contact with the reverse side of an adjacent section cut from said first web.

12. A method of making an unexpanded block of honeycomb comprising the steps of: applying to the obverse side of a continuously moving first web of metal foil material equidistantly spaced parallel lengthwise extending lines of a liquid adhesive of the type capable of being dried to a substantially dry, non-tacky condition and thereafter advanced to a flowable tacky state; applying to the obverse side of a second continuously moving web of material of the same width as said first web equidistantly spaced parallel lengthwise extending lines of said liquid adhesive in staggered relationship with respect to the adhesive lines applied to the obverse side of said first web; drying said liquid adhesive lines applied to both said first and second webs to a substantially dry non-tacky condition; forming a plurality of closely spaced relatively small perforations in scattered pattern through each said first and second webs between said adhesive lines applied thereto; cutting said first and second continuous webs into completely separated sections of equal length; then alternately stacking with one another sections cut from said first web with sections cut from said second web, and with the obverse side adhesive lines of each section cut from said first web in contact with the reverse side of an adjacent section cut from said second web, and with the obverse side adhesive lines of each section cut from said second web disposed parallel to and between said obverse side adhesive lines of sections cut from said first web and in contact with the reverse side of an adjacent section cut from said first web; and then advancing said adhesive lines to a flowable tacky state to cause said lines to adhere to the adjacent sections of material with which said adhesive lines are in respective contact.

13. A method of making an unexpanded block of honyecomb comprising the steps of: applying to the obverse side of a continuously moving first web of material spaced parallel lines of adhesive; applying to the reverse side of said first web of material parallel lines of adhesive spaced between said adhesive lines applied to the obverse side of said first web; cutting said first web into completely separated sections of equal length; providing blank sections of material cut from a second web of said material the same size as the sections cut from said first web; then alternately stacking sections cut from said first web with sections cut from said second web with the adhesive lines applied to the obverse side of each section cut from said first web in contact with a first side of an adjacent section cut from said second web, and with the adhesive lines applied to the reverse side of each section cut from said first web in contact with the second side of an adjacent section cut from said second web.

14. A method of making an unexpanded block of honeycomb comprising the steps of: applying to the obverse side of a continuously moving first web of material spaced parallel lines of a liquid adhesive of the type capable of being dried to a substantially dry, non-tacky condition and thereafter advanced to a flowable tacky state; applying to the reverse side of said first web of material parallel lines of said liquid adhesive spaced between said adhesive lines applied to the obverse side of said first web; drying said liquid adhesive lines on both sides of said first web to a substantially dry, non-tacky condition; cutting said first web into completely separated sections of equal length; providing blank sections of material cut from a second web of said material the same size as the sections cut from said first web; then alternately stacking sections cut from said first web with sections cut from said second web with the adhesive lines applied to the obverse side of each section cut from said first web in contact with a first side of an adjacent section cut from said second web, and with the adhesive lines applied to the reverse side of each section cut from said first web in contact with the second side of an adjacent section cut from said second web; then advancing said adhesive lines to a flowable tacky state to cause the adhesive lines applied to the sections cut from said first web to adhere to contiguous surfaces of sections cut from said second web.

15. A method of making perforate metal foil honeycomb by the expansion process comprising the steps of: providing a quantity of adhesive in liquid form of a type capable of being advanced successively to a dry, non-tacky first state at room temperature, and then to a second flowable state upon being subjected to heat substantially above room temperature, and thence to a third relatively dry, infusible state; applying said adhesive in liquid form to opposite sides of said sheet in equidistantly spaced parallel lines and with the adhesive lines on one side of said sheet disposed midway between the adhesive lines on the other side of said sheet; drying said adhesive to its relatively dry and non-tacky first state; forming a plurality of closely spaced apertures through the sheet between each adhesive line throughout substantially the entire width and length of said web; cutting said sheets into completely separated sections of equal length, and stacking said sheets one upon the other in such way that contiguous bonding lines of adjacent sheets are in aligned contact with one another; applying heat to said stack sufficient to advance said adhesive to its said second state to cause said contiguous adhesive lines of adjacent sheets to flow and adhere together and to also cause adhesive to advance to its said third state; and then expanding a stack of said adhered sheets to cause opening up of the honeycomb cells.

References Cited in the file of this patent

UNITED STATES PATENTS

| | | |
|---|---|---|
| 765,412 | Budwig | July 19, 1904 |
| 2,553,054 | Lincoln et al. | May 15, 1951 |
| 2,581,421 | Lombard et al. | Jan. 8, 1952 |
| 2,609,068 | Pajak | Sept. 2, 1952 |
| 2,609,315 | Engel et al. | Sept. 2, 1952 |
| 2,610,934 | Steele | Sept. 16, 1952 |

FOREIGN PATENTS

| | | |
|---|---|---|
| 625,036 | Great Britain | June 21, 1949 |